United States Patent

Kim et al.

Patent Number: 6,014,492
Date of Patent: *Jan. 11, 2000

[54] VIDEO SIGNAL RECORDING AND REPRODUCING APPARATUS FOR DIGITAL VIDEO CASSETTE TAPE RECORDER

[75] Inventors: Yung Gil Kim, Seoul; Yong Hoo Sheen; Joong Kwon Joh, both of Kyungki-Do; Jae Ryong Kim, Seoul; Sang Joon Woo, Kyungki-Do; Dong Hwa Lee, Seoul; Man Chul Choi, Seoul; Je Hyoung Lee, Seoul; Tae Kyung Kwon, Kyungki-Do; Sang Mun Lee; Tae Suck Bark, both of Seoul; Doo Hee Lee, Kyungki-Do; Kyoung Il Min, Seoul; Soon Ki Lim, Seoul; Tae Joon Park, Seoul, all of Rep. of Korea

[73] Assignee: LG Electronics Inc., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/788,944

[22] Filed: Jan. 23, 1997

[30] Foreign Application Priority Data

Feb. 7, 1996 [KR] Rep. of Korea .................. 96-2906

[51] Int. Cl.[7] .................................... H04N 5/91
[52] U.S. Cl. ........................... 386/67; 386/46; 386/40; 360/69
[58] Field of Search .................. 386/1, 46, 67, 386/32, 37, 40, 124; 360/69, 73.02, 73.08; 348/5, 558; H04N 5/91

[56] References Cited

U.S. PATENT DOCUMENTS

| | | | |
|---|---|---|---|
| 5,359,428 | 10/1994 | Kubota et al. | 358/335 |
| 5,377,050 | 12/1994 | Yun | 360/32 |
| 5,477,263 | 12/1995 | O'Callaghan et al. | 348/7 |
| 5,532,831 | 7/1996 | Choi et al. | 358/335 |
| 5,583,648 | 12/1996 | Ichinoi et al. | 386/37 |
| 5,598,273 | 1/1997 | Kurisaki et al. | 386/9 |
| 5,606,423 | 2/1997 | Wedam | 386/27 |
| 5,682,457 | 10/1997 | Woo et al. | 386/95 |

*Primary Examiner*—Wendy Garber
*Assistant Examiner*—Vincent F. Boccio
*Attorney, Agent, or Firm*—Ostrolenk, Faber, Gerb & Soffen, LLP

[57] ABSTRACT

A video signal recording and reproducing apparatus for a digital video cassette tape recorder by which it is possible to judge the transmission amount of the digital data inputted from a digital source, the type of the video tape, and whether or not the tape is recorded in accordance with the judgment result, for thus automatically controlling a recording mode and a reproducing mode, which includes a tape type detector for judging a tape type in accordance with a recordable wavelength of the video tape on which a digital signal is recorded; a data rate detector for detecting and judging a data transfer rate of a digital signal, and a controller for varying a recording or reproducing speed in accordance with the judged tape type and the data transfer rate of the digital signal.

16 Claims, 4 Drawing Sheets

FIG. 1
CONVENTIONAL ART
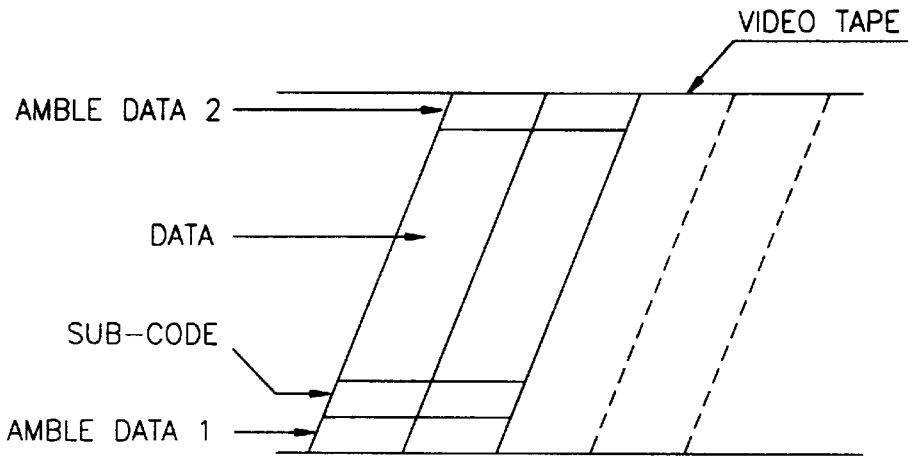
FIG. 2A
FIG. 2B
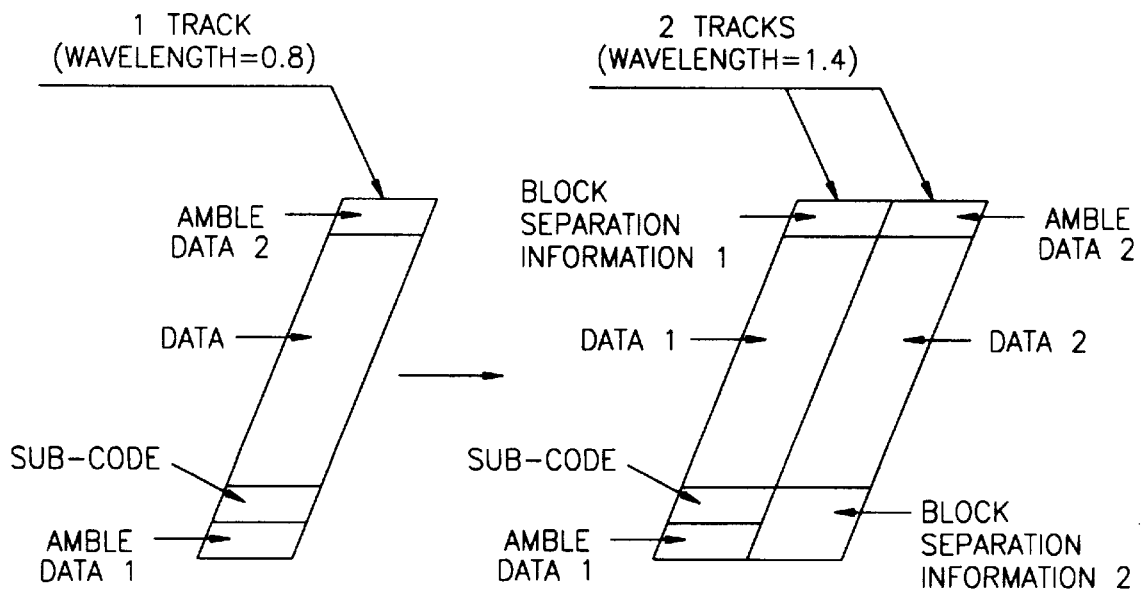

VIDEO SIGNAL RECORDING AND REPRODUCING APPARATUS FOR DIGITAL VIDEO CASSETTE TAPE RECORDER

BACKGROUND OF THE INVENTION

1. Field of the Invention

The present invention relates to a video signal recording and reproducing apparatus for a digital video cassette tape recorder which is capable of judging the transmission amount of the digital video data inputted from a digital video source, the type of video tape, and whether of not the tape is recorded in accordance with the judgment result, thus automatically controlling a recording mode and a reproducing mode.

2. Description of the Conventional Art

Generally, a digital video cassette tape recorder (DVCR) records a digital video signal outputted from a certain digital broadcast source such as an advanced television system, a cable decoder, and a satellite broadcast signal receiver onto a video tape magnetic recording medium and to reproduces the recorded digital video signal.

The DVCR includes an integrated receiver decoder (IRD) (not shown), which is referred to as an exclusive receiver, for receiving digital video signals from a digital broadcast source, for thus recording the received digital video signal onto a video tape using a video signal processing means and for reproducing the recorded digital signal.

A digital VHS VCR (DVHS) is one type of DVCR directed to recording digital signals onto a video tape in a recording pattern as shown in FIG. 1 and reproducing the recorded digital signal.

Here, one track of the tape includes a first preamble data region which is recorded at the start portion of each track and indicates the start of the track, a sub-code region which indicates certain information referred to the recording/reproducing operation, a main data region which includes a video information, and a second preamble data region which is recorded at the end portion of each track and indicates the end of the track.

The above-mentioned digital signal is received through the IRD (not shown). A format unit formats the video signal. A signal processor modulates the signal, and then the signal is recorded onto a video tape in the pattern as shown in FIG. 1. The signal reproduced from the video tape is demodulated by the signal processor, and formatted by the format unit and then is outputted. Here, the rotation speed of a head drum in the recording/reproducing mode is 1800 rpm which is the same as in the conventional VHS format VCR.

Here, the digital tape, that is, a super VHS (SVHS) tape, is generally used, which has a recording wavelength of 0.8 $\mu$m rather than the 1.4 $\mu$m wavelength of the normal VHS type tape so as to more effectively record/reproduce a large amount of digital information thereon without recording/reproducing loss and noise as compared with the analog video signal.

However, because the recording pattern of the digital video signal recording and reproducing apparatus for a conventional DVHS-VCR is completely different from that of an analog broadcast, as shown in FIG. 1, only the high density tape is used.

That is, when recording/reproducing the digital video signal, since the DVHS-VCR is directed to recording on and reproducing from only the S-VHS tape which is a high density tape, when using the common VHS video tape, which is intended for recording and reproducing an analog signal in the DVHS-VCR, it is impossible to record and reproduce therewith since the recording density is low.

The recording density difference is referred to the recordable wavelength of the tape. Generally, in case of the common VHS video tape, the recordable wavelength is about 1.4 $\mu$m, and the recordable wavelength of the S-VHS tape is about 0.8 $\mu$m.

Therefore, when recording the digital video data, it is possible to record as much as one track as shown in FIG. 1 on the S-VHS tape having a recordable wavelength of 0.8 $\mu$m, the recordable region on which the data can be recorded is limited with the VHS tape having a low density of a recordable wavelength of about 1.4 $\mu$m, so that it is impossible to record the digital data in only one track of the S-VHS tape of the common VHS tape.

Namely, in order to record and reproduce the digital signal in the prior art, a high density video tape should be used.

The above-mentioned problem causes lack of compatibility with the common video tape of the widely used analog type VCR.

Therefore, when a user records and reproduces using a normal tape in the DVHS-VCR, and there is no display on the screen, the user may think there is a problem in the system. So as to overcome the above-mentioned problem, when the system is equipped with the VHS recording prevention apparatus, and the user inserts a normal tape and selects a recording mode, the recording operation may not be operational, and then the user may think there is a problem in the system. The above-mentioned problem may cause inconvenience in properly using the system and is confusing to the user.

In addition, when recording the digital data on the high density tape intended for the digital data, if the amount of the digital data is substantially small, it is wasteful to record the digital data on the high density video tape.

SUMMARY OF THE INVENTION

Accordingly, it is an object of the present invention to provide a video signal recording and reproducing apparatus for a digital video cassette tape recorder, which overcomes the problems encountered in the conventional video signal recording and reproducing apparatus for a digital video cassette tape recorder.

It is another object of the present invention to provide an improved video signal recording and reproducing apparatus for a digital video cassette tape recorder by which it is possible to judge the transmission amount of the digital data inputted from a digital source, the type of a video tape, and whether or not the tape is recorded in accordance with the judgment result, for automatically controlling a recording mode and a reproducing mode.

To achieve the above objects, there is provided a video signal recording and reproducing apparatus for a digital video cassette tape recorder, which includes a tape type detector for judging a tape type in accordance with a recordable wavelength of the video tape magnetic recording medium on which a digital signal is recordable; a data rate detector for detecting and judging a data transfer rate of a digital signal; and a controller for varying a recording or reproducing speed in accordance with the judged tape type and the data transfer rate of the digital signal.

BRIEF DESCRIPTION OF THE DRAWINGS

The present invention will be more fully understood from the detailed description given hereinbelow and the accompanying drawings which are given by way of illustration only, and thus do not limit the present invention, and wherein:

FIG. 1 is a diagram showing a pattern of a digital signal recorded on a video tape in a conventional DVHS VCR;

FIGS. 2A and 2B are diagrams showing a digital data recording pattern as one track on a high density tape (FIG. 2A) and two tracks on a normal tape (FIG. 2B) in accordance with the present invention;

DETAILED DESCRIPTION OF THE INVENTION

FIGS. 2A and 2B show data formats of a digital signal recorded on a video tape according to the present invention. As shown therein, the digital signal which can be recorded on one track of an S-VHS tape having a recordable wavelength of 0.8 μm is divided for recording on two tracks of a normal tape having a recordable wavelength of 1.4 μm.

That is, since the recording wavelength of the S-VHS tape used for the DVHS VCR is 0.8 μm, and the recording wavelength of the normal tape used for the VHS VCR is 1.4 μm, the digital signal recordable as one track on the S-VHS tape is divided into two tracks and then recorded on the normal tape. The digital signal can be recorded on and reproduced from the normal tape by varying the rotation speed of the head drum and the tape transferring speed to 2× speed.

The variations with respect to the track division, the rotation speed of the head drum, and tape transferring speed can be made by detecting the kind of tape. The kind of the tape is detected and classified into a high density tape or a low density tape in accordance with a recordable wavelength of the tape.

When varying the recording and reproducing speed in accordance with the kind of the detected tape, it is performed in proportion to the recordable wavelength of the detected tape. Preferably, the ratio is an integer number of times.

For example, when recording the digital signal which can be recorded on one track of the S-VHS tape having a recordable wavelength of 0.8 μm, on the normal tape having a recordable wavelength of 1.4 μm, since only two tracks are necessary to record the digital signal on the normal tape, the rotation speed of the head drum and the tape transferring speed are set to 2× speed.

That is, when recording on and reproducing from the normal tape in the SP mode, it is necessary to vary the rotation speed of the head drum from 1800 rpm to 3600 rpm and the running speed of the tape, and when recording on and reproducing from the normal tape in the LP mode, it is necessary to vary the rotation speed of the head drum to 1800 rpm and the running speed of the tape.

In addition, the mode conversion from the LP mode to the SP mode and from the SP mode to the LP mode is based on a value which is obtained by detecting the transmission rate of the inputted digital signal and by comparing the detected transmission rate with a previously set reference transmission rate so as to perform the mode conversion.

Figure 3:
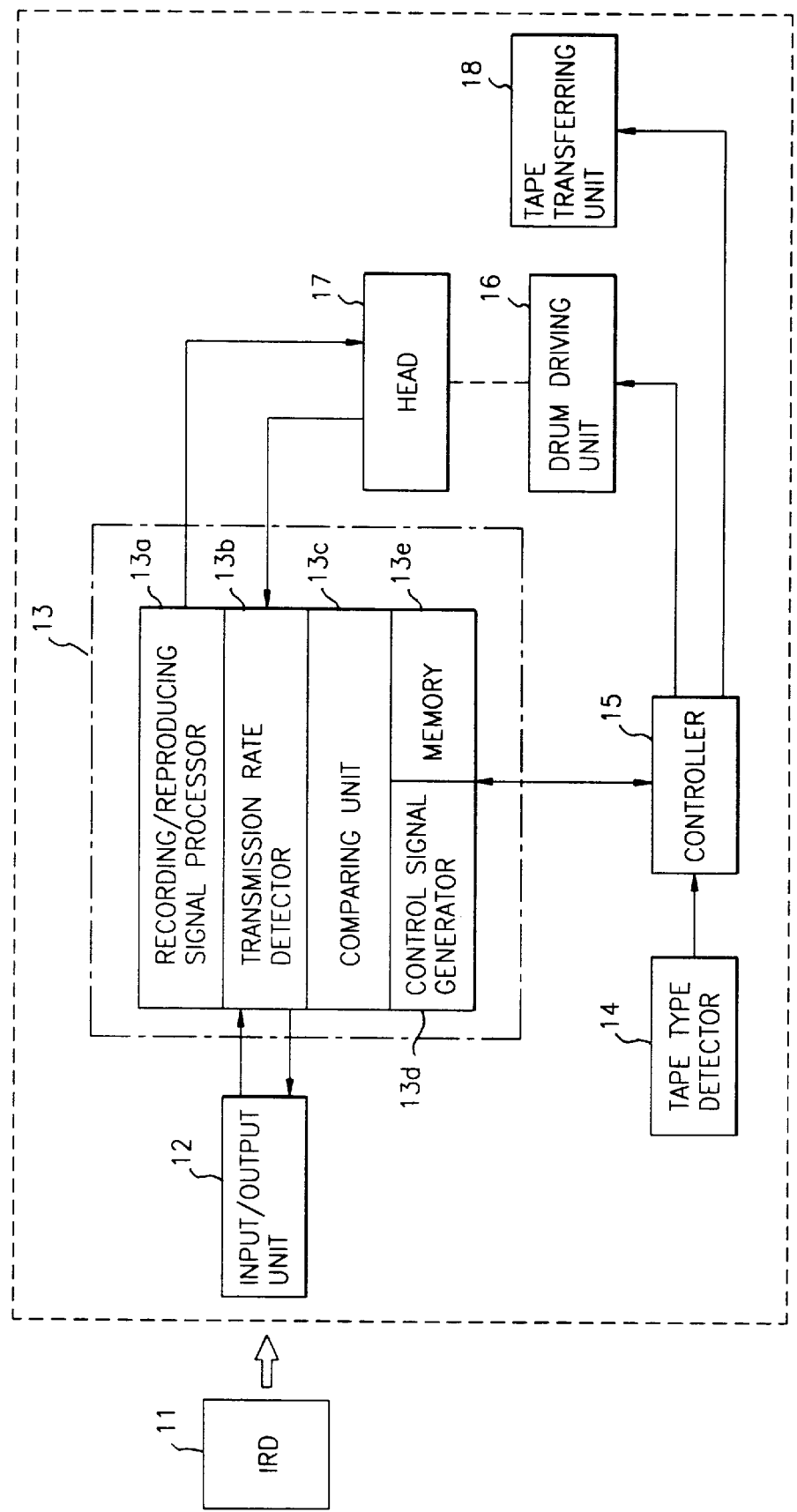
FIG. 3 is a schematic block diagram of a video signal recording and reproducing apparatus for a DVHS VCR according to a first embodiment of the present invention.

FIG. 3 shows the construction of the video signal recording and reproducing apparatus for a digital videocassette tape recorder according to a first embodiment of the present invention, which includes an IRD 11 for receiving a broadcasting signal from a digital signal source, and a video cassette tape recorder (VCR) 19 for recording a digital signal outputted form the IRD 11 on a video tape magnetic recording medium and for reproducing the recorded digital signal therefrom.

The VCR 19 includes an input/output unit 12 for inputting a received digital signal and for outputting a reproduced digital signal, a signal processor 13 for processing the inputted digital signal for the recording format, processing the reproduced digital signal for the reproducing format, and outputting a recording and reproducing control signal by detecting the transmission rate of the inputted digital signal, a tape type detector 14 for detecting the type of the tape in accordance with the recordable wavelength of the video tape, a controller 15 for judging the kind of the tape and for controlling the recording and reproducing speed in accordance with a control signal outputted from the signal processor 13, a drum driving unit 16 for driving the head drum in accordance with the control of the controller 15, a head 17 for recording the digital signal outputted from the signal processor 13 on the video tape or reproducing the recorded digital signal therefrom, and a tape transferring unit 18 for transferring the video tape in accordance with the control of the controller 15.

In more detail, the signal processor 13 includes a recording/reproducing signal processor 13a for processing the recording and reproducing signal for the recording and reproducing formats, a transmission rate detector 13b for detecting the transmission rate of the inputted digital signal, a comparing unit 13c for comparing the detected transmission rate with a predetermined reference value, a control signal generator 13d for outputting a control signal to the controller 15 in accordance with a comparing signal from the comparing unit 13c, and a memory 13e for storing various information.

In addition, the tape type detector 14 includes an optical sensor for detecting a hole which is formed in a predetermined shape in a cassette for detecting a corresponding type of the tape. For example, when the hole is detected, it can be judged that the S-VHS tape is inserted, or when the hole is not detected, it can be judged that the S-VHS tape is not inserted.

In addition, in the recording mode a small amount of, the digital signal may be recorded by for detecting the error correction code ECC. In the reproducing mode, the a small amount of recorded digital signal may be reproduced. Here, when the detected error correction code ECC is more than the previously set reference value, the tape type is judged as the S-VHS tape. When the detected error correction code ECC is less that the reference value, the tape type is judged as the normal tape. Namely, the error correction code ECC may be used for judging the type of the tape.

The operation of the video signal recording/reproducing apparatus for a digital VCR according to the first embodiment of the present invention will now be explained by reference to the accompanying drawings.

To begin with, the controller 15 receives the tape type detection signal from the tape type detector 14 and judges whether the inserted video tape is the S-VHS tape having a recordable wavelength of 0.8 μm or the normal tape having a recordable wavelength of 1.4 μm.

Here, the controller 15 outputs a control data for signal speed (1×) to the drum driving unit 16 and the tape transferring unit 18 when the judged tape type is the S-VHS tape. When the judged tape type is the normal tape, one of the SP mode (3600 rpm) and the LP mode (1800 rpm) is automatically selected in accordance with a transmission rate of the input digital signal, so that the rotation speed of the head drum and the running speed of the tape is accordingly controlled.

That is, when in the SP mode, the rotation speed of the head drum is controlled to 3600 rpm (2× speed), and as shown in FIG. 2B, the digital signal is divided into two tracks and then recorded on two tracks on the normal tape. In addition, when in the LP mode, the rotation speed of the head drum is controlled to 1800 rpm(1× speed), and the digital signal is divided into two tracks and then recorded on two tracks on the normal tape.

A program received from a digital video signal source may be classified into either a program which has fast motion such as a sports program or a program which has low motion such as a drama program.

Therefore, the program having high motion and thus more data content should be recorded in the SP mode (3600 rpm) so as to obtain a desired resolution and picture quality. In this case, the available recording time is reduced.

Meanwhile, since a program such as a drama has lower motion and data, even in the LP mode (1800 rpm) it is possible to obtain a substantial resolution and a long recording time on a tape. So, in this embodiment of the present invention, as a result of the judgment of the type of the tape, a data transfer rate is decided. The recording speed is varied in the recording mode (SP or LP mode) in response to the data transfer rate at a variable speed.

The operation of the data transfer rate judgment for controlling the mode selection will now be explained.

The digital signal outputted from the digital broadcasting source is received from the IRD 11, and then inputted to the signal processor 13 through the input/output unit 10.

Thereafter, the recording/reproducing signal processor 13a of the signal processor 13 processes the inputted digital signal to the recording format of the tape as shown in FIG. 1 or 2 and then outputs the formatted signal to the head 17.

Here, the data processing is directed to correcting errors in the inputted digital signal and generating the additional information (a sub-code) to be recorded, and then the signal is formed into a packet pattern to be recorded on the video tape, and the recording timing is generated, and the signal processing such as a modulation and the like is performed.

Thereafter, the data transfer rate detector 13b detects the data transfer rate of the inputted digital signal and then outputs the detection to the comparing unit 13c. The data transfer rate is detected from the program specific information (PSI) of the digital signal format as shown in FIG. 5.

Figure 5:
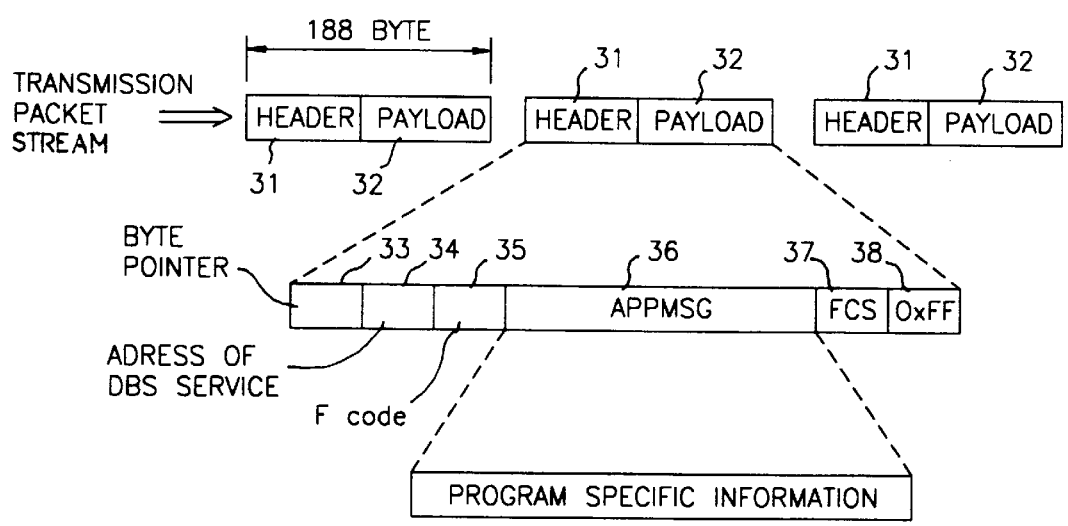
FIG. 5 is a diagram showing the format of a digital video data of FIG. 4 in accordance with the present invention.

The signal format transferred from the digital signal source, as shown in FIG. 5, is as follows. Namely, the transfer packet stream of 188 bytes includes a header 31 and a payload 32, and the payload 32 includes a byte pointer 33, an address of a DBS service, a special function code Fcode 35, a special message APPMSG 36, a frame detection sequence FCS 37, and a stuffing byte OxFF 38.

Here, the data transfer rate detector 13b detects an information indicating an average (or maximum) data transfer rate of each program among the program information PSI of the special message APPMSG 36.

The comparing unit 13c receives the thusly detected data transfer rate and then compares it with a predetermined reference value stored in the memory 13e and judges the current data transfer rate.

For example, in case that the data transfer rate is a maximum of 14.1 bps, the value 14.½ bps corresponding to one-half thereof is set as a reference value, and the reference value is compared with the data transfer rate of the current detected program.

In addition, as a result of the comparison, the control signal generator 13d outputs a recording speed (LP mode or SP mode) control signal to the controller 15.

Namely, where the current video tape is judged to be a normal tape, the recording speed is controlled to become 2× speed in the SP mode, and at this time, if the data transfer rate of the digital signal is decreased such that it is possible to record in the LP mode, the recording speed is controlled at 1× speed.

Therefore, the recording speed for the normal tape is varied in accordance with the data transfer rate, so that it is possible to satisfy a recording time and a picture quality in relation with the tape type and the data transfer rate, thus obtaining a desired recording control.

Meanwhile, when reproducing the recorded digital signal, the operation is performed in the reverse order of the recording.

In the reproducing mode, the controller 15 receives a tape type detection signal from the tape type detector 14 and then judges the type of the tape. When the judged tape type is the normal tape, the operation mode is judged as to whether it is the SP mode or the LP mode.

As a result, when the current tape is the normal tape in the SP mode, the controller 15 controls the drum driving unit 16 at 2× speed (3600 rpm), and when the current tape is the normal tape in the LP mode, the controller 15 controls the same at 1× speed (1800 rpm).

Therefore, the digital that is divided into two tracks and recorded accordingly is reproduced by the head 17, and the reproduced digital signal is demodulated for the reproducing format by the recording/reproducing signal processor 13a of the signal processor 13 and then is processed for error correction and the data formatting. Thereafter, signal is outputted through the input/output unit 12, whereby the signal is reproduced in accordance with the type of the tape and the transfer rate of the data.

Figure 4:
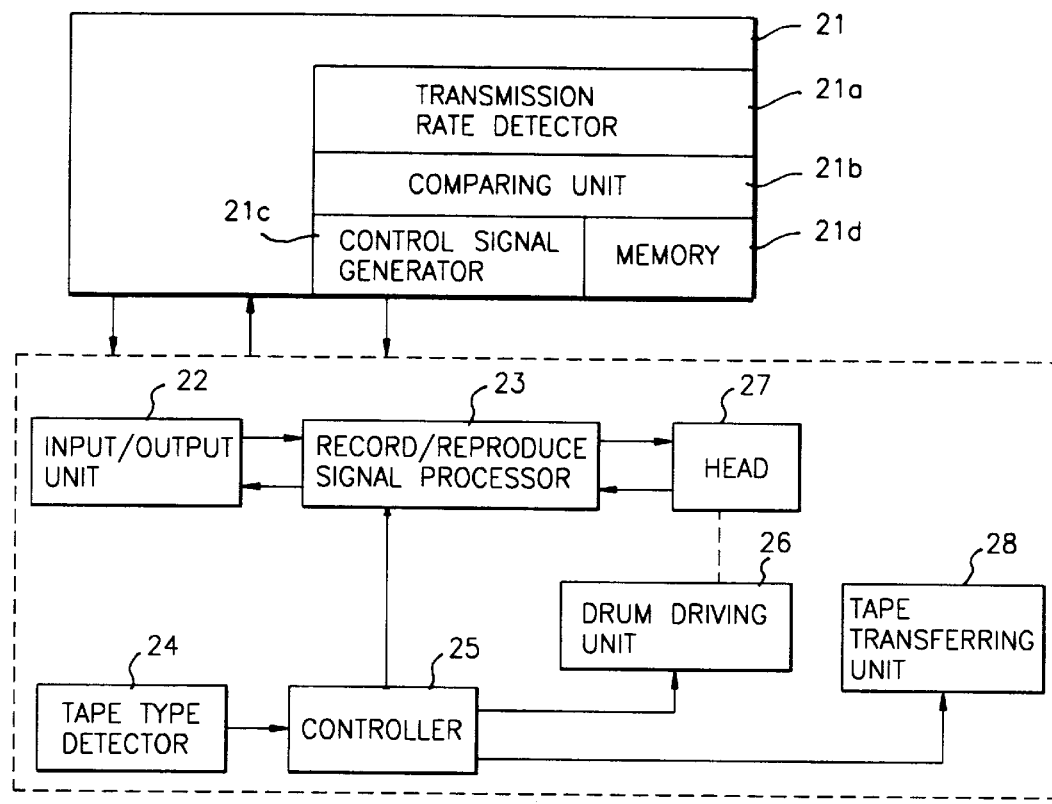
FIG. 4 is a schematic block diagram of a video signal recording and reproducing apparatus of a DVHS VCR according to a second embodiment of the present invention.

In addition, FIG. 4 shows the video signal recording/reproducing apparatus for the digital VCR according to a second embodiment of the present invention, which includes an IRD 21 for receiving a broadcast signal supplied thereto from a digital signal source, and a VCR 29 for recording the digital signal outputted from the IRD 21 on a video tape and for reproducing the recorded digital signal.

The IRD 21 includes a data transfer detector 21a for detecting the transfer rate of the inputted digital signal, a comparing unit 21b for comparing the detected transfer rate with a predetermined reference rate, a control signal generator 21c for outputting a control signal in accordance with a comparison signal from the comparing unit 21b, and a memory 13e for storing various information.

In addition, the VCR 29 includes the input/output unit 12 for receiving a digital signal and for outputting a reproduced digital signal, a recording/reproducing signal processor 23 for processing the inputted digital signal for a recording format and for processing the reproduced digital signal for a reproducing format, a tape type detector 24 for detecting the type of the tape in accordance with the recordable wavelength of the video tape, a controller 25 for receiving the tape type detection signal, judging the type of the tape, and controlling the recording/reproducing signal processor 23 in accordance with a recording or reproducing mode, a drum driving unit 26 for driving the head drum in accordance with the control of the controller 15, a head 27 for recording a digital signal outputted from the recording/reproducing signal processor 23 on a video tape and for reproducing the recorded digital signal therefrom, and then outputting it to the recording/reproducing signal processor 23, and a tape transfer unit 28 for transferring the video tape in accordance with the control of the controller 25.

The operation of the video signal recording/reproducing apparatus for a digital VCR according to the second embodiment of the present invention will now be explained.

Figure 6:
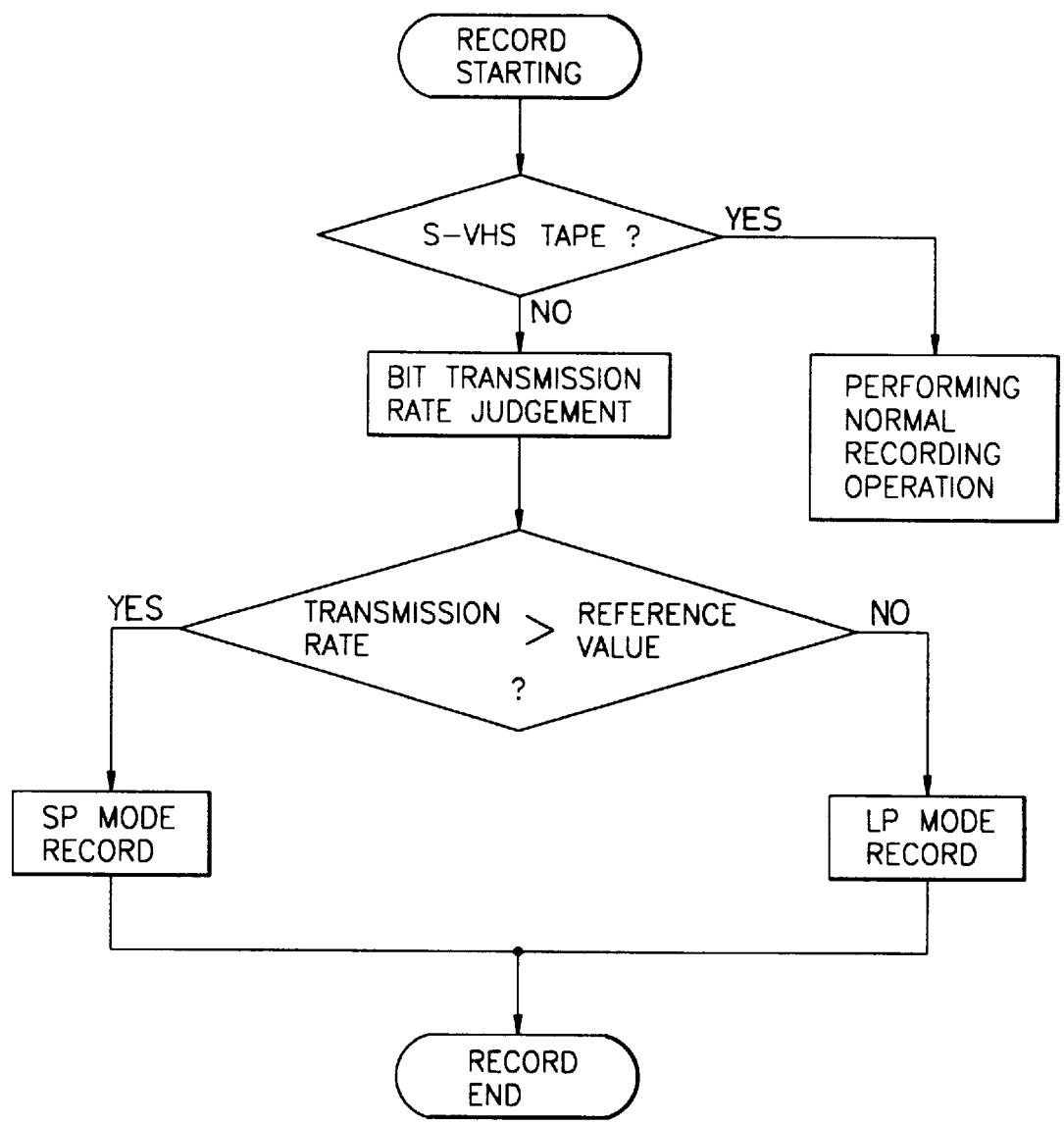
FIG. 6 is a flow chart showing a control process in the recording mode according to the present invention.

To begin with, the recording operation will first be explained with reference to the flow chart of FIG. 6.

The controller 25 receives a tape type detection signal detected by the tape type detector 24 and judges whether the inserted video tape is the S-VHS tape having a recordable wavelength of 0.8 μm or the normal tape having a recordable wavelength of 1.4 μm.

In addition, the digital signal outputted from a digital signal source is received by the IRD 21 and then is inputted to the recording/reproducing signal processor 23 through the input/output unit 22.

At this time, the transfer rate detector 21a of the IRD 21 detects the data transfer rate information from the PCI of the digital signal format as shown in FIG. 5 and outputs the transfer rate to the comparing unit 21b. The comparing unit 21b receives the detected data transfer rate and compares it with the reference value stored in the memory 21d, and thereby judging the current data transfer rate.

For example, when the data transfer rate is referred to a maximum of 14.1 bps, the value of 14.½ bps corresponding to one-half the maximum 14.1 bps is set as a reference value, and then the reference value is compared with the data transfer rate of the current digital signal.

As a result of the comparison, the control signal generator 21c outputs a recording speed (LP mode or SP mode) control signal to the controller 25.

Namely, when the type of the tape is the normal tape, the controller 25 controls the recording speed at 2× speed compared to 1× speed for the high density tape. When it is considered to record in the LP mode since the data transfer rate of the digital signal is low, the controller 25 controls the recording speed at 1× speed.

Therefore, the recording speed is varied in accordance with the type of the tape and the data transfer rate, and thereby it is possible to achieve a desired control of a tape recordable time and picture quality.

Meanwhile, when reproducing the recorded digital signal, the operation is performed in the reverse order of recording.

Namely, in the reproducing mode, the controller 25 receives a tape type detection signal from the tape type detector 24, and judges the type of the tape. When the judged tape type is the normal tape, it is judged whether the current mode is the SP mode or the LP mode.

As a result, when the current tape is the normal tape in the SP mode, the controller 25 controls the drum driving unit 26 at 2× speed (3600 rpm), and when the current tape is to the normal tape in the LP mode, the controller 25 controls the same at 1× speed (1800 rpm).

Therefore, the digital signal divided into two tracks and recorded on the tape is reproduced by the head 27, and the reproduced digital signal is demodulated for the reproducing format by the recording/reproducing signal processor 23 and then is processed for error correction and data formatting. Thereafter, the signal is outputted through the input/output unit 22, and thereby the signal is reproduced in accordance with the type of the tape and the transfer rate of the data.

As described above, the video signal recording and reproducing apparatus for a digital video cassette tape recorder in accordance with the present invention is directed to automatically controlling the recording/reproducing speed in accordance with the tape type and the data transfer rate based on the recordable wavelength of the tape, for thus recording/reproducing the digital signal at a predetermined speed which is best suited for the transmitted program.

In addition, when dividing the digital signal into multiple tracks and then recording/reproducing on the normal tape, since the operation mode is automatically switched between the SP mode and the LP mode in accordance with the data transfer rate of the digital signal, it is possible to obtain the optimum mode selection and the optimum recording time in accordance with the program.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A digital video signal recording and reproducing apparatus for recording and reproducing one program of a digital video signal from a received digital video signal having multiple programs having multiple signal transfer rates, the apparatus comprising:

means for judging a transfer rate of a digital video signal to be recorded by detecting an information indicating data transfer rate included in a transmitted digital video signal; and means for varying a recording and a reproducing speed in accordance with the judged tape type and the judged data transfer rate of the digital video signal; and means for recording digital data on a tape and detecting an ECC (Error Correction Code) value from the recorded data and judging therefrom a tape type such that, if the detected ECC value exceeds a reference value, the tape type is judged to be S-VHS type and if the detected ECC value is less than the reference value, the tape type is judged to be VHS type.

2. The apparatus of claim 1, wherein said recording and reproducing speed is controlled between an SP mode and an LP mode in accordance with the judged tape type and the data transfer rate.

3. The apparatus of claim 1, in which the recording and reproducing speed can be varied between speeds of about 1800 rpm and 3600 rpm.

4. The apparatus of claim 1, in which the recordable wavelength includes a wavelength of about 0.8 micrometers and a wavelength of about 1.4 micrometers.

5. The apparatus of claim 1, in which the tape type includes an S-VHS tape.

6. A digital video signal recording and reproducing apparatus for recording and reproducing one program of a digital video signal from a received digital video signal having multiple programs having multiple signal transfer rates the apparatus comprising:

means for performing an input/output operation of an inputted digital video signal and a reproduced digital video signal;

means for processing the inputted digital signal for recording and the reproduced digital signal for reproducing;

means for judging a transfer rate of a digital video signal to be recorded by detecting an information indicating data transfer rate included in a transmitted digital video signal;

means for receiving a detected data transfer rate and comparing the detected data transfer rate with a predetermined reference value to obtain a comparison result;

means for controlling an operation mode between an SP mode and an LP mode when recording and reproducing in accordance with the comparison result; and means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type.

7. A digital video signal recording and reproducing apparatus for recording and reproducing one program of a digital video signal from a received digital video signal having multiple programs having multiple signal transfer rates, the apparatus comprising:

means for receiving and processing a digital video signal;

means for judging a transfer rate of a digital video signal to be recorded by detecting an information indicating data transfer rate included in a transmitted digital video signal, processing the signal for a recording format and then recording on a video tape, and processing and outputting a recorded digital signal for a reproducing format;

means for varying a recording and reproducing speed in accordance with the detected tape type and the detected data transfer rate; and means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type.

8. A digital video signal recording and reproducing apparatus for recording and reproducing one program of a digital video signal from a received digital video signal having multiple programs having multiple signal transfer rates, the apparatus comprising:

means for receiving and processing a recordable digital video signal and for detecting a data transfer rate of the digital video signal;

means for processing the recordable digital video signal for a recording format and then recording the processed recordable digital video signal on a video tape and for processing a recorded digital signal for a reproducing format and then outputting a processed reproduced signal;

means for varying a recording and reproducing speed in accordance with the detected tape type and the detected data transfer rate; and means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type.

9. A digital video signal recording and reproducing apparatus for recording and reproducing one program of a digital video signal from a received digital video signal having multiple programs having multiple signal transfer rates, the apparatus comprising:

means for detecting a data transfer rate of information carried on a digital video signal;

means for comparing the detected data transfer rate in accordance with the judged tape type with a predetermined reference value and for controlling a recording speed between an SP mode and an LP mode;

means for recording the digital signal on the video tape in accordance with the controlled recording speed; and means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type.

10. A digital video signal recording and reproducing apparatus for recording and reproducing a digital video signal having multiple signal transfer rates, the apparatus comprising:

means for obtaining a reproducing mode judgment result of either an SP mode and an LP mode in accordance with the tape type judgment result;

means for controlling a reproducing speed in accordance with the reproducing mode judgment result; and means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type.

11. A method for recording and reproducing one program of a digital video signal from a received digital video signal having multiple programs having multiple signal transfer rates, the method comprising:

judging a transfer rate of a digital video signal to be recorded by detecting an information indicating data transfer rate included in a transmitted digital video signal;

recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type; and varying a recording and a reproducing speed in accordance with the judged tape type and the data transfer rate of the digital video signal.

12. The method of claim 11, including controlling the recording and reproducing speed between an SP mode and an LP mode in accordance with the judged tape type and the data transfer rate.

13. A method for recording and reproducing one program of a digital video signal from a received digital video signal having multiple pages having multiple signal transfer rates, the method comprising:

performing an input/output operation of an inputted digital video signal and a reproduced digital video signal;

processing the inputted digital signal for recording and the reproduced digital signal for reproducing;

judging a transfer rate of a digital video signal to be recorded by detecting an information indicating data transfer rate included in a transmitted digital video signal;

receiving a detected data transfer rate and comparing the detected rate with a predetermined reference value to obtain a comparison result;

recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type; and controlling an operation mode between an SP mode and an LP mode when recording or reproducing in accordance with the comparison result.

14. A digital video signal recording and reproducing apparatus for recording and reproducing one program of a digital video signal from a received digital video signal having multiple programs having multiple signal transfer rates, the method comprising:

judging a transfer rate of a digital video signal to be recorded by detecting an information indicating data transfer rate included in a transmitted digital video signal;

recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type;

comparing the detected data transfer rate in accordance with the judged tape type with a predetermined reference value and controlling a recording speed between an SP mode and an LP mode; and recording a digital signal on the video tape in accordance with a controlled recording speed.

15. A method for recording and reproducing one program of a digital video signal from a received digital video signal having multiple programs having multiple signal transfer rates, the method comprising:

recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type;

obtaining a reproducing mode judgment result of either an SP mode and an LP mode in accordance with the tape type; and controlling a reproducing speed in accordance with the reproducing mode judgment result.

16. A digital video signal recording and reproducing apparatus for recording and reproducing one program of a digital video signal from a received digital video signal having multiple programs having multiple signal transfer rates, the apparatus comprising:

means for recording digital data on a tape and detecting an ECC (Error Correction Code) value from the recorded data and judging therefrom a tape type such that if the detected ECC value exceeds a reference value, the tape type is judged to be S-VHS type and if the detected ECC value is less than the reference value, the tape type is judged to be VHS type a member for judging a transfer rate of a digital video signal to be recorded by detecting an information indicating data transfer rate included in the transmitted digital video signals; and a controlling element for varying a recording and a reproducing speed in accordance with the judged tape type and the data transfer rate of the digital video signal.

* * * * *